United States Patent [19]
Torii et al.

[11] Patent Number: 5,075,534
[45] Date of Patent: Dec. 24, 1991

[54] ARC SENSOR PROVIDED WITH A TRANSPARENT OBJECTIVE WINDOW HAVING A CONTAMINATION PREVENTING CONSTRUCTION

[75] Inventors: Nobutoshi Torii, Hachioji; Hiroshi Wakio; Masahiro Hagihara, both of Yamanashi, all of Japan

[73] Assignee: Fanuc Ltd., Yamanashi, Japan

[21] Appl. No.: 571,584

[22] PCT Filed: Jan. 10, 1990

[86] PCT No.: PCT/JP90/00019
§ 371 Date: Aug. 29, 1990
§ 102(e) Date: Aug. 29, 1990

[87] PCT Pub. No.: WO90/08007
PCT Pub. Date: Jul. 26, 1990

[30] Foreign Application Priority Data
Jan. 10, 1989 [JP] Japan ................................ 1-1378

[51] Int. Cl.$^5$ ................................ B23K 9/32
[52] U.S. Cl. ................................ 219/130.01
[58] Field of Search .............. 219/130.01, 124.34, 219/130.21

[56] References Cited

U.S. PATENT DOCUMENTS

| 4,497,996 | 2/1985 | Libby, Jr. et al. | 219/124.34 |
| 4,859,829 | 8/1989 | Dufour | 219/124.34 |

FOREIGN PATENT DOCUMENTS

| 52-21012 | 5/1977 | Japan. | |
| 52-99949 | 8/1977 | Japan. | |
| 61-27178 | 2/1986 | Japan | 219/124.34 |
| 62-79336 | 4/1987 | Japan. | |

*Primary Examiner*—Clifford C. Shaw
*Attorney, Agent, or Firm*—Armstrong, Nikaido, Marmelstein, Kubovcik & Murray

[57] ABSTRACT

An arc sensor (10) to be attached to an arc welding torch for detecting a welding spot is provided with an optical detecting system having an optical position detector (14), an objective lens (18), and a transparent objective window (20) arranged in front of the objective lens, and a plurality of arc light screening plates (22 and 24) made of an opaque material, and having a light transmitting apertures (22a and 24a), the plurality of arc light screening plates (22 and 24) being arranged in front of the transparent objective window (20) and spaced from one another for screening an arc light but permitting the detecting light beam to pass therethrough.

4 Claims, 2 Drawing Sheets

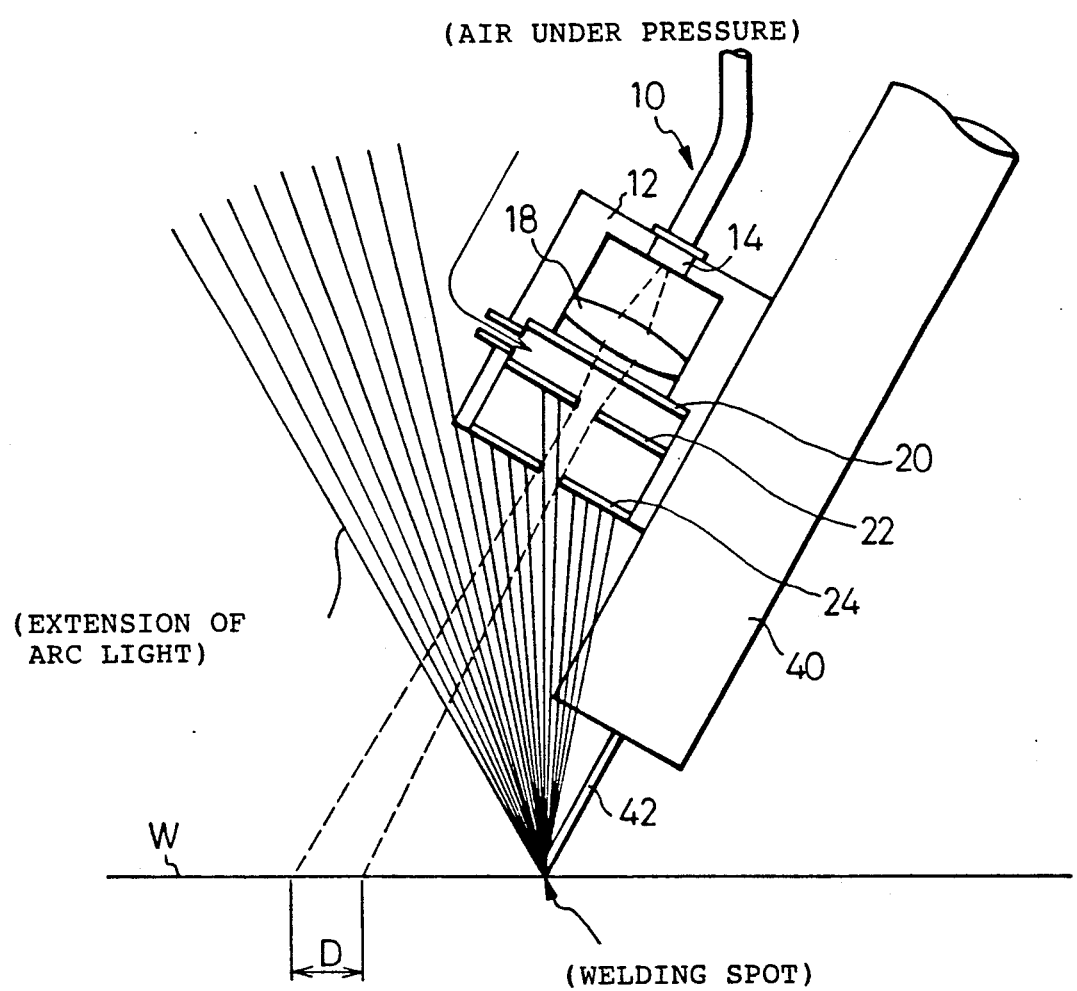

ARC SENSOR PROVIDED WITH A TRANSPARENT OBJECTIVE WINDOW HAVING A CONTAMINATION PREVENTING CONSTRUCTION

TECHNICAL FIELD

The present invention relates to an arc sensor for detecting welding positions, i.e., welding spots, by a scanning method, and attached to a welding torch of an arc-welding machine capable of an automatic welding, such as an automatic arc-welding machine or an arc-welding robot. More particularly it relates, to an arc sensor provided with a transparent objective window having a contamination preventing construction and capable of not only improving the measuring sensitivity thereof but also facilitating and simplifying a maintenance operation of the arc sensor, which comprises, as principal components, an optical welding spot detecting unit including therein a light emitting element and a light receiving element, an objective lens disposed in front of the optical welding spot detecting unit to project the light emitted by the light emitting element onto a region of a work to be welded and to focus the light when reflected by the region of the work to be welded, and a transparent objective window disposed in front of the objective lens.

BACKGROUND ART

Automatic arc-welding machines and arc-welding robots are used for unmanned, labor-saving automatic welding operations in, for example, an automatic welding line in an automobile assembly shop The welding torch of such,.automatic arc-welding machines and arc-welding robots is provided with an arc sensor for continuously detecting welding spots, to thereby achieve an accurate and precision arc-welding. The arc sensor has a light emitting element, a light receiving element and an objective lens, which are contained in a container disposed behind a transparent objective window made of a transparent material, projects a beam of light for the detection of welding spots through the transparent objective window onto a work to be welded, receives a beam of the light reflected by the work via the transparent objective window, protects the welding spot detecting system by the transparent objective window from an ingress of external foreign substances such as sputtered particles and soot generated during arc welding, and prevents adverse effects of the arc light on the transmission of the detecting light beam. The conventional arc sensor incorporates various devices including a transparent objective window made of a transparent resin or a heat-resistant glass, so that the attaching of sputtered particles to the surface of the transparent objective window is prevented, and employs a laser beam emitted as a detecting light by a semiconductor laser beam emitter and having a frequency within a specific frequency band, to thereby permit the detecting light to be transmitted through the arc light.

Nevertheless, the conventional arc sensor of the above-mentioned construction has a drawback in that the accuracy and sensitivity of the detection are lowered due to a loss of the transparency of the transparent objective window resulting from not only the scorching of the transparent objective window by sputtered particles scattered from the surface of the work during arc welding but also a smoking of the window by soot from the arc-welding flux, and thus the transparent objective window must be often periodically cleaned.

Further, the periodical cleaning of the transparent objective window requires manual labor to implement such a cleaning operation, and therefore, reduces the labor-saving effect of the unmanned, labor-saving assembly line.

DISCLOSURE OF THE INVENTION

Therefore, an object of the present invention is to solve the above problems by eliminating the troublesome periodical cleaning, and to provide an arc sensor fitted with a transparent objective window having a protective construction and capable of improving the welding spot detecting function of the arc sensor.

In accordance with the present invention, there is provided an arc sensor for detecting a welding spot of a work to be welded and able to be attached to an arc welding torch, and including a detecting unit provided with an arc sensor able to be attached to an arc welding torch to detect a welding spot of a work to be welded. The detecting unit includes a detecting means provided with an optical position detector provided with a light emitting element for emitting a detecting light beam toward the work to be welded, and a light receiving element for receiving the detecting light beam when reflected from the work to be welded; an objective lens arranged in front of the optical position detector; and a transparent objective window member arranged in front of the objective lens. The arc sensor is characterized in that it further comprises at least two arc light screening plate means arranged in front of the transparent objective window member of the detecting means and made of an opaque material; the at least two arc light screening plate means each being provided with a light transmitting aperture formed therein for permitting only the detecting light beam to pass therethrough, respectively, and arranged to be spaced apart from one another. The detecting light beam emitted from the light emitting element is projected through the light transmitting apertures of the arc light screening plate means toward a predetermined region to be detected, and an arc light is prevented from impinging on the surface of the transparent objective window member by the two arc light screening plate means. Therefore, the welding position or spot detecting sensitivity can be maintained at a necessary level for a long time, and the maintenance of the arc sensor can be simplified. In addition, since contamination of the arc sensor due to penetration of the sputtered particles and soot can be reduced, a high detecting performance of the arc sensor having a high signal to noise ratio ( S/N ratio ) of the detecting light beam is obtained Further, a pressurized fluid chamber, preferably a compressed air chamber, is provided between the transparent objective window and the arc light screening plate means, and an air under pressure introduced from an external compressed air source into the compressed air chamber is spouted from the chamber through the light transmitting apertures of the arc light screening plate means toward the work to be welded. Therefore, the spouted air under pressure promotes a prevention of the penetration of sputtered particles and soot into the detecting system, and accordingly, the maintenance of the arc sensor can be further simplified and the detecting performance of the sensor can be enhanced.

BRIEF DESCRIPTION OF THE DRAWINGS

The above and other objects, features and advantages of the present invention will be made more apparent from the ensuing description of the embodiments, with reference to the accompanying drawings wherein:

FIG. 3 is a front elevational view, in part cross-section, of the arc sensor, illustrating a state where the arc sensor is attached to a welding torch of an automatic arc-welding machine or an arc-welding robot

BEST MODE OF CARRYING OUT THE INVENTION

Figure 1:
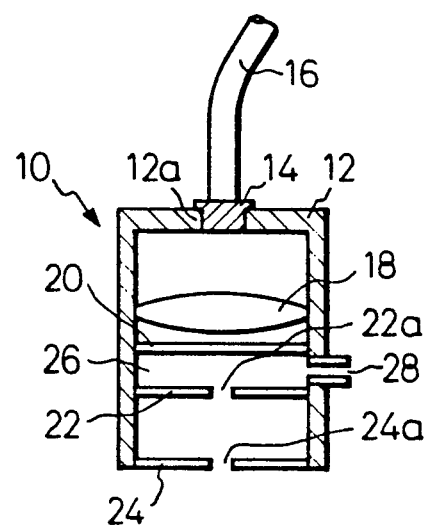
FIG. 1 is a longitudinal cross-sectional view of an arc sensor with a transparent objective window protecting structure according to an embodiment of the present invention.
Figure 2:
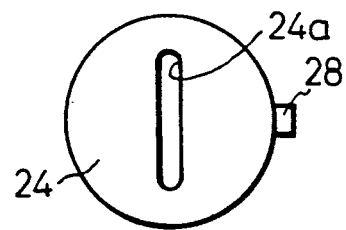
FIG. 2 is a bottom view of an arc light screening plate of the arc sensor, illustrating a slit formed in the screening plate.

Referring to FIGS. 1 and 2, an arc sensor 10 according to an embodiment of the present invention includes a casing 12 having one open end and one rear wall 12a on which a welding spot detector 14 provided with a light emitting element and a light receiving element is mounted, and an electric cable 16 for transmitting a signal is connected to the welding spot detector 14. Within the casing 12 is disposed a lens 18 in front of the welding spot detector 14, to project a detecting beam of light such as a laser beam emitted by the light emitting element of the welding spot detector 14 onto a surface of a work to be welded, and to focus the light beam reflected by the work onto the light receiving element A transparent objective window 20 is disposed in front of the lens 18, to protect the detecting system from an ingress of sputtered particles and soot generating during the welding operation of an arc welding torch to which the arc sensor is attached. The transparent objective window 20 is preferably made of a transparent resin material or a heat-resistant glass. The construction and arrangement of the optical detecting system provided with the welding spot detector 14, the lens 18, and the transparent objective window 20 are conventional.

In accordance with the present invention, the arc sensor 10 is further provided with a pair of inner and outer arc light screening plates 22 and 24 arranged in the casing 12 in front of the transparent objective window 20 in such a manner that a space remains between the arc light screening plates 22 and 24. The arc light screening plates 22 and 24 are made of an opaque, heat-resistant material, such as an aluminum alloy or an iron system material including a stainless steel, and screen an intense arc light generated at an arc-welding spot and prevent detrimental substances including sputtered particles and soot, from penetrating the welding spot detecting system. The arc light screening plates 22 and 24 are provided, at respective central portion thereof, with small coaxial apertures 22a and 24a, to permit the projected detecting light beam and the reflected detecting light beam to pass therethrough. Each of the small coaxial apertures 22a and 24a is formed as a small pin-hole, but may be formed as an elongated narrow slit suitable for a continuous scanning of a plurality of welding spots. In the present embodiment, the small apertures 22a and 24a are formed as elongated narrow slits as illustrated in FIG. 2. A pressure chamber 26 is provided between the transparent objective window 20 and the inner arc light screening plate 22, and a pressurized fluid such as air under pressure is supplied by a suitable pressure conduit from an appropriate external compressed air source into the pressure chamber 26 via an inlet 28. The air under pressure is spouted from the pressure chamber 26 through the small apertures 22a and 24a, whereby sputtered particles and soot are prevented from penetrating the detecting system during the arc welding operation. Note, the pressure of the spouted air need not be high, i.e., the pressure may be such that the air under pressure is able to expel the sputtered particles and soot.

In FIG. 3, the arc sensor 10 provided with the transparent objective window protecting structure is attached to a body of an arc-welding torch 40 of an arc-welding machine or an arc-welding robot. Namely, the detecting system is shielded from the arc light, sputtered particles and soot by the transparent objective window protecting structure.

The detecting light beam emitted by the welding spot detector 14, and the reflected detecting light beam reflected by a work W travel through the transparent objective window 20, and the respective small apertures 22a and 24a of the arc light screening plates 22 and 24, as indicated by dotted lines, to scan and detect a detectable region D. During the scanning and detecting operation by the arc sensor 10, a control is conducted so that a welding rod 42 extending from an extremity of the arc-welding torch 40 is brought to the region D detected by the arc sensor 10 and applies an arc welding effect to a welding spot of the work W within the detected region D. At this time, an intense arc light, sputtered particles and soot are dispersed substantially radially from the welding spot, and accordingly, the arc light travels toward the outer arc light screening plate 24 of the arc sensor 10, but only a small, limited amount of the arc light and the least amount of sputtered particles and soot enter the casing 12 through the small aperture 24a. Nevertheless, the arc light, the sputtered particles and the soot entering the casing 12 are subsequently blocked by the inner arc light screening plate 22, and thus the contamination of the surface of the transparent objective window 20 by a direct adhesion of the sputtered particles and soot to the surface of the transparent objective window 20 can be prevented, and a reduction of signal to noise ratio ( S/N ratio ) of the detecting light beam due to an adverse affect by the arc light also can be prevented. Therefore, the spot welding detecting system disposed behind the transparent objective window 20 is protected by the arc light screening plates 22 and 24.

Moreover, a discharge of the pressurized fluid, i.e., a spouting of the air under pressure through the respective small apertures 22a and 24a of the arc light screening plates 22 and 24 from the pressure chamber 26, increases the protective effect of the arc light screening plates 22 and 24.

The foregoing arc sensor according to the embodiment of the present invention is provided with a pair of arc light screening plates 22 and 24. The arc sensor, however, may be provided with three or four arc light screening plates, as required The shape of the small apertures 22a and 24a of the arc light screening plates 22 and 24 may be altered as required For example, the respective small apertures 22a and 24a of the arc light screening plates 22 and 24 may be pin-holes instead of the illustrated elongated slits, when the arc-welding operation is to be performed at fixed spots on the work W.

From the foregoing description, it will be understood that, according to the present invention, an arc sensor attached to the arc-welding torch of an automatic arc-welding machine or an arc-welding robot and detecting a welding spot can be protected from contamination by sputtered particles and soot to maintain a normal detecting performance of the arc sensor for a long time, while simplifying and facilitating the maintenance work needs to guaranty the normal detecting performance of the arc sensor. Thus, the arc sensor is able to maintain the welding spot detecting sensitivity at a high level for a long term use, enables the detecting light beam to be satisfactorily maintained at a high level S/N ratio for a long term use, and accordingly, the performance of the automatic arc-welding machine or the arc-welding robot can be improved.

We claim:

1. An arc sensor attachable to an arc welding torch to detect a welding spot of a work to be welded, comprising:

a detecting means provided with an optical position detector having a light emitting element for emitting a detecting light beam toward a work to be welded, and a light receiving element for receiving the detecting light beam when reflected from the work to be welded;

an objective lens arranged in front of the optical position detector;

a transparent objective window member arranged in front of the objective lens;

at least two arc light screening plate means arranged in front of the transparent objective window member of the detecting means and made of an opaque material, the at least two arc light screening plate means each being provided with a light transmitting aperture formed therethrough for permitting only the detecting light beam to pass therethrough and into the detecting means, respectively, and the at least two arc light screening plate means being arranged to be spaced apart from one another.

2. An arc sensor according to claim 1, wherein a pressure chamber is provided between said transparent objective window member and one of said at least two arc light screening plate means arranged in front of the transparent objective window member, said pressure chamber being connectable to a pressurized fluid source for spouting a flow of a fluid under pressure through said light transmitting apertures of said arc light screening plate means, to thereby prevent a penetration of foreign substances from the outside into said detecting means.

3. An arc sensor according to claim 1, wherein said light transmitting apertures of said arc light screening plate means are elongated narrow slits.

4. An arc sensor according to claim 1, further comprising a casing means for holding said detecting means and said arc light screening plate means.

* * * * *